United States Patent
Pallett et al.

(10) Patent No.: US 9,310,219 B2
(45) Date of Patent: Apr. 12, 2016

(54) METHODS OF AND APPARATUS FOR DISPLAYING MAP INFORMATION

(75) Inventors: Gary Pallett, Calne (GB); Breght Roderick Boschker, Hilversum (NL)

(73) Assignees: TomTom International B.V., Amsterdam (NL); TomTom Software Ltd, London (GB)

( * ) Notice: Subject to any disclaimer, the term of this patent is extended or adjusted under 35 U.S.C. 154(b) by 436 days.

(21) Appl. No.: 13/640,118

(22) PCT Filed: Oct. 4, 2010

(86) PCT No.: PCT/EP2010/064765
§ 371 (c)(1),
(2), (4) Date: Dec. 19, 2012

(87) PCT Pub. No.: WO2011/124276
PCT Pub. Date: Oct. 13, 2011

(65) Prior Publication Data
US 2013/0135345 A1     May 30, 2013

Related U.S. Application Data

(60) Provisional application No. 61/322,325, filed on Apr. 9, 2010.

(51) Int. Cl.
*G06T 15/00* (2011.01)
*G01C 21/36* (2006.01)
(Continued)

(52) U.S. Cl.
CPC ............ *G01C 21/3664* (2013.01); *G01C 21/34* (2013.01); *G01C 21/3484* (2013.01); *G01C 21/3626* (2013.01); *G06F 3/0484* (2013.01); *G06F 8/70* (2013.01); *G06F 9/541* (2013.01); *G06T 11/60* (2013.01)

(58) Field of Classification Search
None
See application file for complete search history.

(56) References Cited

U.S. PATENT DOCUMENTS 6,016,150 A    1/2000 Lengyel et al.
8,368,695 B2   2/2013 Howell et al.
(Continued)

FOREIGN PATENT DOCUMENTS

CN    101107631 A    1/2008
CN    102016505 A    4/2011
(Continued)

OTHER PUBLICATIONS

Origin, "Origin Help" version 7, available online since Feb. 2006.*
(Continued)

*Primary Examiner* — Yingchun He

(57) ABSTRACT

In a system that uses tile-based road network rendering for displaying map information to a user, a tile is rendered for display by rendering a front tile (20) with an appropriate texture to depict, e.g., the "ground" and a see-through shape (22) representing a feature that is below the ground level, and rendering a rear tile (21) that has drawn on it an image region (23) representing the intended below ground level feature, surrounded by a color or texture (24) that represents a border for that feature, to appear behind and slightly offset relative to the front tile (20), such that the image region (23) and its corresponding border (24) on the rear tile (21) can be seen through the see-through shape (22) in the front tile (20). In this way, a more visually appealing depiction of the below ground level feature can be achieved.

16 Claims, 10 Drawing Sheets

(51) Int. Cl.
  *G01C 21/34* (2006.01)
  *G06F 9/44* (2006.01)
  *G06F 9/54* (2006.01)
  *G06T 11/60* (2006.01)
  *G06F 3/0484* (2013.01)

(56) References Cited

U.S. PATENT DOCUMENTS

| | | | |
|---|---|---|---|
| 8,620,106 | B2 | 12/2013 | Pryszo et al. |
| 8,665,263 | B2 | 3/2014 | Yoshida et al. |
| 9,257,044 | B2 | 2/2016 | Boschker |
| 2006/0170693 | A1* | 8/2006 | Bethune et al. ............... 345/568 |
| 2008/0192053 | A1 | 8/2008 | Howell et al. |
| 2009/0067750 | A1 | 3/2009 | Pryszo et al. |
| 2009/0213111 | A1* | 8/2009 | Jung ............................ 345/419 |

FOREIGN PATENT DOCUMENTS

| | | | |
|---|---|---|---|
| CN | 102105907 | A | 6/2011 |
| CN | 102138163 | A | 7/2011 |
| EP | 2138926 | A1 | 12/2009 |
| JP | 2006259035 | A | 9/2006 |
| JP | 2007170834 | A | 7/2007 |
| JP | 2007199331 | A | 8/2007 |
| JP | 2008128928 | A * | 6/2008 |
| JP | 2008181168 | A | 8/2008 |
| JP | 2009287973 | A | 12/2009 |
| WO | 2008041338 | A1 | 4/2008 |

OTHER PUBLICATIONS

RockWorks, downloaded @ http://web.archive.org/web/20081121145139/http://www.rockware.com/rockworks/revisions/V2006_2006_q2.htm, available Nov. 21, 2008.*

International Search Report issued Jan. 13, 2011 for International Application No. PCT/EP2010/064765.

Anonymous: "Become a layer-blending expert", Internet Citation, Dec. 31, 2003, pp. 1-3, XP002524044, Retrieved from the Internet: URL:http://www.adobe.com/designcenter/photoshop/articles/phs8advblend/phs8advblend.pdf [retrieved on Apr. 8, 2009].

* cited by examiner

METHODS OF AND APPARATUS FOR DISPLAYING MAP INFORMATION

CROSS-REFERENCES TO RELATED APPLICATIONS

This application is the National Stage of International Application No. PCT/EP2010/064765, filed Oct. 4, 2010 and designating the United States. The application claims the benefit of U.S. Provisional Application No. 61/322,325 filed Apr. 9, 2010. The entire contents of both these applications are incorporated herein by reference.

FIELD OF THE INVENTION

This invention relates to navigation devices and to methods and apparatus for displaying map information, such as navigation maps. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to display map information and/or to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route recalculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 950 LIVE model manufactured and supplied by TomTom International B.V., provide a reliable means for enabling users to navigate from one position to another.

As will be appreciated from the above, an important aspect of the operation of such navigation devices is the display of map information to the user by the device. This may be done, for example, by rendering the whole scene based on the vector data for each frame.

Another known technique is to represent the map information (in the 3D world) on a tile-by-tile basis, i.e. to represent the 3D "world" view of the map (which will then be transformed to 2D screen space for display, as is known in the art) as one or more tiles, each representing some or all of the map in the 3D world view of the map to be displayed.

In such arrangements, the tiles may, as is known in the art, be stored and displayed at varying resolutions (mipmaps), to provide further visual improvement whilst reducing storage requirements for the generated tiles. The different resolution tiles may also be overlaid and filtered to provide a more seamless transition between mipmaps.

Such tile-based map and road network rendering is an efficient and powerful way for displaying road network and geographic data in both two and three dimensions. Tile-based rendering is especially efficient given that most mobile graphics rendering subsystems (which is typically what will be used in a PND (and may be implemented in hardware or software or both, as is known in the art)) are limited in the amount of geometry they can process in order to get an acceptable frame rate and that a lot of the more powerful features found in desktop graphics accelerators have not made it to the mobile space yet.

However, there is a limitation to the tile-based solution in that everything that is displayed must, by definition, be embedded within (and thus co-planar to) the tiles themselves, or needs to be added on top of the tiles in the form of extra geometry (e.g. buildings). While the former is typically sufficient for roads and the latter suffices for buildings, the Applicants have recognised that tile-based methods in their current form are not so well suited for displaying features that are below (or above) the ground level such as water features (canals, rivers etc.) and/or lowered road segments or indeed any 'open air' feature that could be represented at lower or higher than ground level.

For example, while such features can be rendered co-planar to (i.e. 'in') the ground plane, that often does not give the desired visual quality.

Alternatively, such features can be obtained by modifying the tile geometry, for example by sub-dividing the tiles into smaller tiles and/or triangles and lowering or raising these, or by using e.g. a mesh of triangles where the vertices of the triangles are placed at the correct height or depth. However, this greatly increases the amount of geometry needing to be stored and processed, which generally leads to decreased performance and higher storage cost.

For smaller features, techniques such as (hardware-assisted) bump mapping may be used. On new hardware, features of graphics accelerators such as vertex or geometry shaders may be used to modify the geometry fed to the graphics accelerators. Additionally, techniques such as edge detection and extrusion can be used to simulate a border effect.

However, particularly on mobile devices, such techniques can be either inefficient due to the amount of geometry required or impossible due to the necessary hardware features missing in the graphics rendering sub-system that is used in the device.

The Applicants believe therefore that there remains scope for improvements to the display of map information on navigation devices.

SUMMARY OF THE INVENTION

According to a first aspect of the present invention, there is provided a method of displaying map information using tile-based map information rendering, the method comprising:

for a tile to be displayed to display the map information:

rendering a front tile that has one or more see-through shapes in the plane of the tile; and rendering one or more rear tiles that are behind the front tile and that have thereon one or more image regions that overlap with the one or more see-through shapes in the plane of the front tile, such that the image regions on the rear tile or tiles will be seen through the see-through shapes in the front tile when the map information is displayed.

According to a second aspect of the present invention, there is provided a navigation or mapping apparatus, comprising:

a display for displaying a digital map to a user; and a processor configured to access digital map data and cause a digital map to be displayed on the display using tile-based map information rendering; and characterised by the processor further comprising:

means for, for a tile to be displayed to display the map information:

rendering a front tile that has one or more see-through shapes in the plane of the tile; and rendering one or more rear tiles that are behind the front tile and that have thereon one or more image regions that overlap with the one or more see-through shapes in the plane of the front tile, such that the image regions on the rear tile or tiles will be seen through the see-through shapes in the front tile when the map information is displayed.

In the present invention, map information to be displayed is rendered by rendering a front tile in which one or more see-through shapes have been provided, and rendering one or more further tiles that are behind the front tile to, in effect, "fill in" (with additional visual information) the see-through shapes in the front tile. In particular, the rear tiles have image regions thereon that will be seen through the see-through shapes in the front tile(s) in the displayed image.

As will be discussed further below, the Applicants have recognised that this can provide a technique for more realistically rendering, for example, features that lie above or below a given plane, such as water features, buildings, windows of buildings, etc., but in a more efficient manner that is suitable for use, e.g., on more limited (e.g. graphics geometry limited) devices, such as mobile devices.

Furthermore, although the visual quality of the present technique may not be able to fully compete with more complex methods used in e.g. gaming (e.g. increasing vertex count, bump mapping etc.), it can provide a relatively fast and efficient way to improve the visual quality of e.g. tile-based map display.

Thus the present invention is well suited to embedded graphics hardware since it can create the desired effects with only a limited increase in geometry, or no increase in geometry (e.g. by reusing existing vertex buffer objects). It therefore lends itself well for use on current and (near) future system-on-chip arrangements for PNDs, since the types of graphics rendering sub-systems contained therein are typically quite restricted in the amount of geometry they can efficiently process.

This said, as will be discussed further below, the present invention is not exclusively applicable to portable and more limited devices, but can also advantageously be used for more powerful graphics rendering sub-systems if desired.

As will be appreciated from the above, the tiles that are rendered and that are being referred to in these aspects of the present invention are tiles representing the map information in the 3D space, and thus are not "tiles" that are used when rendering the 2D scene in screen space for display, but rather tiles in the 3D world which will then be projected to the 2D screen space when they are actually displayed. Thus references herein to tile-based rendering, unless the context clearly requires otherwise, are intended to refer to arrangements in which the image to be displayed (e.g. the map information) is represented as a tile or tiles in 3D "world" space, which tiles are then projected into 2D "screen" space for display.

Equally, references to "front" and "rear" tiles are intended to refer to the relative positions of the tiles in the 3D world space, and do not require, for example, that the "front" tile is the front-most tile for the 3D world space tile position in question, nor, equally, that the "rear" tile is the rear-most tile for that tile position. (Although this said there will, of course, be both a front-most and a rear-most tile at any given position in the 3D world space, and where there is only one front and rear tile at a given position in the 3D world space, the front and rear tiles will then be the front-most and rear-most tiles.) Thus in general, unless the context otherwise requires, references to "front" and "rear" tiles refer to a frontward and rearward tile of a respective pair of tiles, and not necessarily to front-most and rear-most tiles at any given position.

It should also be noted that the rendering order of the front and rear tiles can be chosen as desired (i.e. whether the front or rear tile is first rendered, although in a preferred embodiment the order is back-to-front (painter's algorithm), so that the non-see-through parts of the front tile(s) cover the back tile(s).

The technique of the present invention may be used for as many tiles (tile positions) of the displayed map information (the image being displayed) as desired, e.g., depending on the nature of the image being displayed. Thus there may, for example, be only a single tile position of the image that is rendered using the technique of the present invention, or there may be, and indeed, may more typically be, plural tiles (tile positions) that are so rendered (this would be the case where, e.g., there is a feature, such as a water feature, that passes through plural tiles of the image (map) being displayed). Any tiles that are not rendered using the technique of the present invention may be rendered in the normal manner.

For each front tile that is to be rendered in the manner of the present invention, there may be a single or plural rear tiles (and vice-versa (multiple front tiles for a single rear tile)). In one preferred embodiment there is a single rear tile for each "front" tile that is rendered in the manner of the present invention.

The front tile may, for example, represent the "ground", in which case it should be, e.g., textured appropriately, and the see-through shapes will then represent the positions of below ground level features, such as water features, tunnels, cuttings, etc. It would also be possible for the front tile to represent above "ground" level features, such as the roofs of buildings. In this case the see-through shapes could, e.g., represent the positions of ground level features, such as roads, fields, etc.

It would also be possible for the front tile to represent not the ground, but some other plane, such as the side of a building or other object (e.g. a vertical, rather than a horizontal, plane). In this case the front tile could be used to render, e.g., the face of a building, with the see-through shapes then, e.g., being the positions of windows and/or doors of the building.

The rear tile or tiles (the tiles that are behind the front tile) should thus represent the appropriate feature that is to be behind the front tile and seen through the "gaps" formed by the see-through shapes in the front tile, such as below ground level features, such as tunnels, water features, etc., ground level features, or features in a vertical plane, as appropriate.

The image regions in the rear tile (or stack of rear tiles) should thus represent or show the relevant features that are to be seen "through" the see-through shapes in the front tile (or stack of tiles). Thus they preferably represent one or more of: water features, tunnels, cuttings, windows of buildings, roads, fields, gardens, etc. The image regions should correspondingly be configured to generally overlap (be coincident) with the see-through regions in the front tile when the image is rendered. Thus, in a preferred embodiment, the image region(s) in the rear tile(s) are generally rendered to be similar in size to (to match) the corresponding see-through shape(s) in the front tile. Most preferably the image region on the rear tile has the same size, shape and position on the rear tile as a corresponding see-through shape on the front tile.

In a particularly preferred embodiment, the rear tile(s) are rendered such that the image regions that are intended to be seen through the see-through shapes in the front tile are bordered and/or surrounded by other regions having a different appearance. Most preferably the image regions in the rear tile are bordered by further regions that represent a border to the image regions and the front and rear tiles are rendered (configured) such that when the image is displayed, the border regions will also be seen, at least in part, through the see-through shape(s) in the front tile. This can then relatively straightforwardly give a border effect to the image region in the rear tile.

Thus, in a particularly preferred embodiment, the rear tile includes an image region corresponding to the intended feature that is to be seen through the see-through shape in the corresponding front tile, bordered by a colour and/or texture that represents a, preferably contrasting, border to that region (and that is, preferably, positioned so as to be visible through the front tile as well).

Such border effects can increase the visual quality of the display considerably. In particular, the Applicants have recognised that by providing a contrasting border to the image region that will be seen through the front tile, the human viewer will tend to perceive that border region as a surface or edge extending between the front and rear tiles in the displayed image, thereby giving an enhanced impression of depth in the displayed image (and, in effect, filling in the "gap" between the front and rear tiles).

Thus the arrangement of the border and image region on the rear tile should be such that the border appears between the image region on the rear tile and the image on the front tile, when the image is displayed. The border should therefore appear between the edge of the see-through shape in the front tile, and the image region on the rear tile.

It should also be appreciated that the border need not be seen (and, indeed, is preferably not seen) all the way around the image region in the rear tile when the image is displayed. Rather, the border preferably is seen as would be appropriate for the viewing direction in question, for example, and preferably, at the far side of the image region as seen by the viewer, but not at the near side of the image region as seen by the viewer (where it would be occluded by the front tile). This enhances the visual effect of the image region in the rear tile looking as though it is at a different level to the front tile.

If the image region on the rear tile has the same size, shape and position on the rear tile as a corresponding see-through shape on the front tile, for example, then by having the rear tile behind the front tile in the 3D world space, the border surrounding the image region should be seen appropriately when the image is projected to 2D screen space for display.

The border (region) is also accordingly preferably rendered to be a contrasting colour or shade to the image region on the rear tile. It is preferably darker than the image region, for example black or dark blue or dark gray.

The image regions and borders, etc., may be rendered using any suitable technique, for example by applying a particular texture to the relevant region of the tile.

The rear tile or rear tiles should be behind (i.e. in a different plane to) the front tile and are preferably offset behind the corresponding front tile in an appropriate manner so as to further enhance the quality of the displayed image. In a preferred embodiment, for example in the case of map information display, a vertical offset between the tiles (in 3D space) is used, as that then allows the depth effect provided by the present invention to work from all viewing directions. In this case the rear tile(s) would be below the front tile in the 3D world. In other arrangements, for example when displaying vertical surfaces, such as faces of buildings, a horizontal offset between the tiles (in 3D space) may be, and preferably is, used.

In one preferred embodiment, there is a single layer of front tiles and a single layer of rear tiles. However, it would also be possible to have more than two tile "layers", i.e. such that there will be rear tiles at differing depths behind the front tile. In this case an intermediate rear tile (i.e. that is not the final "back" tile) may have both image regions that are to be seen through see-through shapes in the front tile, and see-through shapes to allow image regions in a rear tile that is below the intermediate rear tile to be seen through the intermediate rear tile (and the front tile).

By stacking tiles (tile layers) at different relative depths, features and borders at different (and at multiple) levels can be obtained.

Thus, in a preferred embodiment, a front tile having one or more see-through shapes, one or more layers of intermediate tiles having both image regions to be seen through see-through regions in higher layer tiles (such as the front tile) and see-through regions to allow lower layer tiles to be seen, and a back tile or tiles having image regions to be seen through the see-through regions in the front and intermediate tiles (tile layers), are rendered.

It would also be possible, for example, where there are plural layers of tiles, for not all the tile layers (e.g. not all the rear tile layers) to be at different relative "depths". Indeed, in a preferred embodiment, the depths of the tile layers are changed based on the viewing angle, area of the map, the matter being viewed, etc.

The see-through shapes in the tiles (the front and intermediate rear tiles) can be provided in any suitable and desired manner. As discussed above, the purpose of the see-through shapes is to allow features in the rear tile(s) that are behind the tiles to be seen in the displayed image. Thus, for example, any suitable rendering technique that can, in effect, provide a see-through shape in a plane (leave a see-through region in a plane) can be used.

In one preferred embodiment, the see-through shapes are rendered by using alpha textures (transparency). Thus, a transparency factor is applied to the areas of the tile where a see-through shape is to appear. This will then allow a viewer to "see through" the transparent area to the tile below. This technique may be particularly suitable where alpha textures are otherwise already enabled for the tiles or image being displayed, as in that case there will be no additional storage cost associated with using alpha textures for the purposes of the present invention.

In a preferred embodiment, the see-through shape is also or instead cut-out from the plane of the tile (i.e. so as to, in effect, leave a "gap" in the tile). This may be done (and preferably is done) using stencilling or scissoring to cut-out the shapes from the tiles. Although stencil masks may require some extra run-time storage, since no colour information, but only a bitmap or grayscale image needs to be stored, this can be quite efficient. Furthermore, stencilling operations are typically implemented in the graphics rendering sub-system hardware and thus typically come only at a slight cost. Using stencilling may be advantageous where the cost of using alpha textures would be undesirable.

Other techniques, such as pixel shading, could also or instead be used to provide the see-through shapes in the tiles, if desired.

The see-through shapes may be completely transparent, or they may be rendered to be only partially transparent, or a combination of the two. For example, the see-through shapes for rendering a tunnel may be rendered to be fully transparent at the entrance to the tunnel, but only semi-transparent where the tunnel is actually underground. Thus, in a particularly preferred embodiment, the see-through shapes in the tiles can be rendered using varying and/or different transparency levels.

In a particularly preferred embodiment, the edges of the see-through shapes are rendered with a different transparency to, and preferably to be less transparent than, the body of the see-through shape. By applying, e.g., semi-transparency, to the edges of the see-through shapes in the tiles, hard lines in the displayed image can be avoided.

A number of other techniques are preferably also used to enhance the quality of the displayed image.

For example, in a preferred embodiment, the rear tiles are preferably enlarged relative to their corresponding front tile. This can help to compensate for visual artifacts created at the edges of a world (although this should not occur very frequently in a continuous landscape).

Similarly, in a preferred embodiment, the position (e.g. offset) of the rear tiles relative to the corresponding front tiles can be, and preferably is, varied in use (as the image is being displayed), e.g., so as to oscillate between two (or more) positions relative to the front tile, e.g., on a frame-by-frame basis. This can be used, e.g., to give the effect of tide or waves when rendering water.

In a preferred embodiment, where available, pixel shading operations are used to enhance the image being displayed, preferably to apply effects to the image regions of the tiles that will be seen through the front tiles. For example, pixel shading operations may be used to simulate the reflection of sunlight and/or waves when rendering water features, to create a more realistic water effect. As these operations may only need to be done on the relatively smaller number of rear (lower) layer tiles, this can be more efficient than enabling the shader programs for all tiles in the scene.

In a preferred embodiment, the depth spacing (distance) between adjacent tile layers, such as a front tile and the tile that is (immediately) behind it is set or configured so as to avoid the incorrect image regions being visible through the see-through shapes in the front tile. The Applicants have recognised that in certain cases, e.g., when the distance between the front and rear tiles is too large, or the space between "gaps" in the front tile is too small, features of adjacent (i.e. incorrect) image regions in a rear tile may become visible through a given see-through shape in the front tile, particularly at shallower viewing angles. However, the Applicants have further recognised that this can be countered by decreasing the spacing between the (planes) of the front and rear tiles.

In a particularly preferred such arrangement, the distance between the rendered tile layers (the difference in the depth values for the tile layers when they are rendered) is selected, preferably automatically, and preferably decreased automatically, as a function of the viewing distance of the tiles in question (the viewing distance, measured as a straight line, being the distance from the viewpoint of the user (i.e. the user's eye) to the (virtual) point in space where the tile is). The Applicants have recognised that the viewing angle tends to decrease as the distance from the viewer increases. Thus decreasing the tile spacing automatically as the viewing distance increases provides an effective and efficient mechanism for achieving the desired effect.

In a particularly preferred arrangement of these embodiments, the system is configured to omit (not render) a rear tile when the tile layer spacing is zero and/or within a particular, preferably predetermined, margin of zero. (In this case the (visual) information that would otherwise have been displayed on the rear tile(s) should instead be included in the front tile.)

Another mechanism for reducing this problem is to detect such situations and, e.g., artificially increase the in-plane distance of the regions (within limits) to counteract the effect.

In a preferred embodiment, the rear tile of a pair of front and rear tiles is tilted relative to the front tile, preferably by tilting the far side of the tile (as seen from the viewing position for the image) up, relative to the nearer side of the tile. This can also help to reduce the undesired visibility of adjacent image regions in the rear tile.

Such tilting of a rear tile can also be used to display, e.g., the entrances and exits of tunnels. In this case, a given front tile may, and in a preferred embodiment does, have two rear tiles arranged behind it, one that is tilted up to meet the front tile (and thus depicts the tunnel entrance or exit) and one that lies flat relative to the front tile (and thus depicts the tunnel body).

Thus, in a particularly preferred embodiment, tiles that are behind the front tile can be rendered such that they are tilted relative to the front tile (to a tile that is in front of them) (such that their plane is tilted relative to the plane of the front tile).

In a preferred embodiment, the rear tiles are scaled, and/or use different geometry and/or textures, if necessary, so as to ensure that they are contiguous (touch). This can help to avoid visible gaps forming between the tiles. The distance between the front and rear tile planes could also or instead be decreased to help avoid this as well.

Although, as will be appreciated from the above, the present invention is particularly suited to displaying features that appear above or below the ground (that appear in ground "faces"), such as building roofs, water features and tunnels, it may equally be used to render other features, and in particular wherever planar surfaces need to have an appearance of depth (such as layers of clouds, for example).

An example of this for map display would be the faces of buildings, for example when displaying city areas. The present invention can be used to give a more realistic display of building faces, as compared, for example, to the typical use of textures that are traditionally used for such display. Moreover, because the rendering of building faces (especially for office buildings) typically uses a repetitive texture, the present invention can be and preferably is, implemented in this case by using defined front and rear tile textures for a single window, and repeating those textures over the face of the building, thereby making its use very efficient.

The technique of the present invention may similarly be, and preferably is, used to simulate building roofs.

The principles of the present invention in any of its aspects and embodiments are applicable to any form of mapping or navigation apparatus and to the display of any desired and suitable form of map information. In preferred embodiments the apparatus is a navigation apparatus. One particular area of utility is in relation to portable navigation devices (PND). In embodiments, therefore, the mapping or navigation apparatus is a portable navigation device (PND). In accordance with a further aspect, the present invention provides a portable navigation device (PND) comprising the apparatus in accordance with any of the aspects or embodiments of the invention described. Accordingly, in embodiments of the invention, the method is a method of operating a mapping or navigation system of a portable navigation device. The PND may, and preferably does, include one or more other features typical of PNDs, such as, and preferably, an input interface configured to enable a user to interact with and/or control the apparatus and/or device.

The invention is also applicable to navigation apparatus which is provided as part of an integrated navigation system. For example the apparatus may form part of an in-vehicle integrated navigation system. In accordance with another aspect of the invention, the present invention provides a navigation system comprising a navigation apparatus in accordance with any of the aspects or embodiments of the invention described. Accordingly, in embodiments of the invention, the method is a method of operating a navigation apparatus of a navigation system. The navigation system may be an integrated in-vehicle navigation system.

Regardless of its implementation, a navigation apparatus of the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the mapping or navigation apparatus may be implemented by means of an application of a processing device which does not form part of a specific mapping or navigation device. For example the invention may be implemented using a suitable computer system arranged to execute mapping or navigation software. The system may be a mobile or portable computer system e.g. a mobile telephone or laptop, or may be a desktop system.

Indeed, the present invention may also be used advantageously in higher end systems, such as desktop systems, if desired. For example, although on a high-end system a high-performance graphics accelerator may be able to render building faces in detail using high vertex models, the techniques of the present invention may be used, for example, for the regions of the image that are further from the viewer where high levels of detail and accuracy may be less important, with the "full" 3D, high-detail, high-vertex models still being used for the nearer regions of the image, thereby allowing a trade-off between relative efficiency and desired image quality.

Although the present invention has been described above with particular reference to tile-based map information rendering, the techniques of the present invention may be applied to other techniques for rendering map information, and indeed, to the rendering of other images, if desired.

For example, the techniques of the present invention could equally be used to provide enhanced map information display when rendering maps using vector graphics or triangle meshes, etc. In this case the technique of the present invention would be implemented by, for example, by representing the image as front and rear "layers" in the 3D world representation of the map information, with the front layer having see-through shapes provided therein and a rear layer or rear layers then having appropriate image regions and border regions to be seen through the see-through shapes in the front layer, in the manner discussed above. (Thus, in effect, the layers would correspond to the tiles discussed above.)

Equally, the technique could be used when rendering images other than map information. For example, as discussed above, the present invention may advantageously be used when displaying buildings, and this need not simply be in the context of map information, but could be used for the display of buildings in other contexts, for example in games or other applications.

Thus, according to a further aspect of the present invention, there is provided a method of displaying an image, comprising:

rendering a front layer that has one or more see-through shapes in the plane of the layer; and rendering a rear layer that is behind the front layer and that has thereon one or more image regions that overlap with the one or more see-through shapes in the plane of the front layer, such that the image regions on the rear layer will be seen through the see-through shapes in the front layer when the image is displayed.

According to a further aspect of the present invention, there is provided an apparatus for displaying an image, comprising:

means for rendering a front layer that has one or more see-through shapes in the plane of the layer, and a rear layer that is behind the front layer and that has thereon one or more image regions that overlap with the one or more see-through shapes in the plane of the front layer, such that the image regions on the rear layer will be seen through the see-through shape or shapes in the front layer when the image is displayed.

As will be appreciated by those skilled in the art, these aspects and embodiments of the invention can and preferably do include any one or more of the preferred and optional features of the invention described herein, as appropriate. Thus, for example, the see-through regions may be provided in the layers in the manner discussed above, the image regions in the rear (lower) layers are preferably provided with appropriate borders surrounding those regions, and there may, for example, be plural layers in a similar manner to the use of plural layers of tiles, as discussed above. Similarly, the different layers preferably comprise respective tiles, and the image to be displayed preferably represents map information.

The methods in accordance with the present invention may be implemented at least partially using software e.g. computer programs. The present invention thus also extends to a computer program comprising computer readable instructions executable to perform a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transistory physical storage medium such as a ROM chip, CD ROM or disk, or could be a signal such as an electronic signal over wires, an optical signal or a radio signal such as to a satellite or the like.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

Like reference numerals are used for like features throughout the drawings.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to display map information (and preferably to execute navigation software so as to provide route planning and navigation functionality). It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
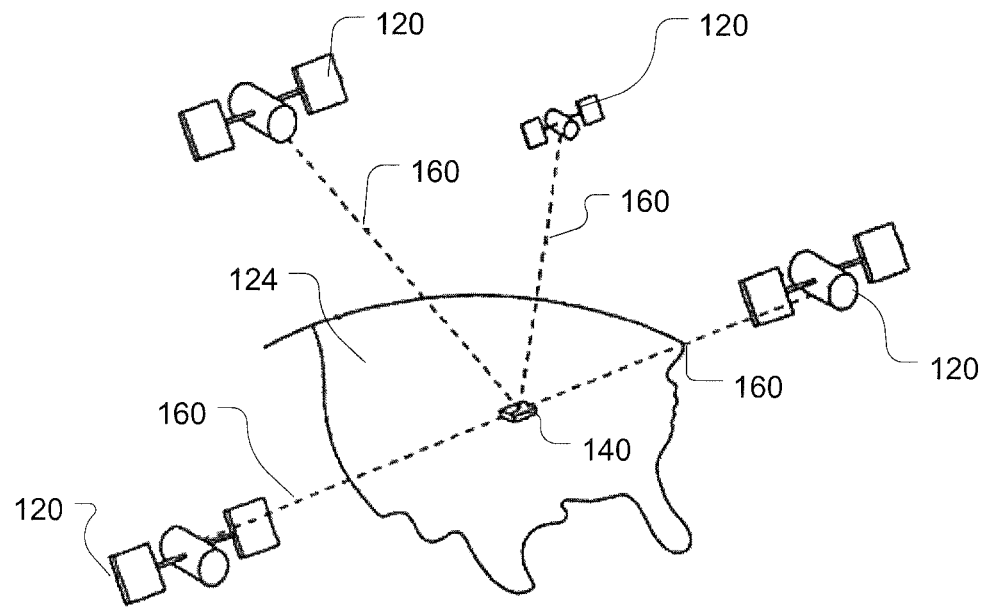
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
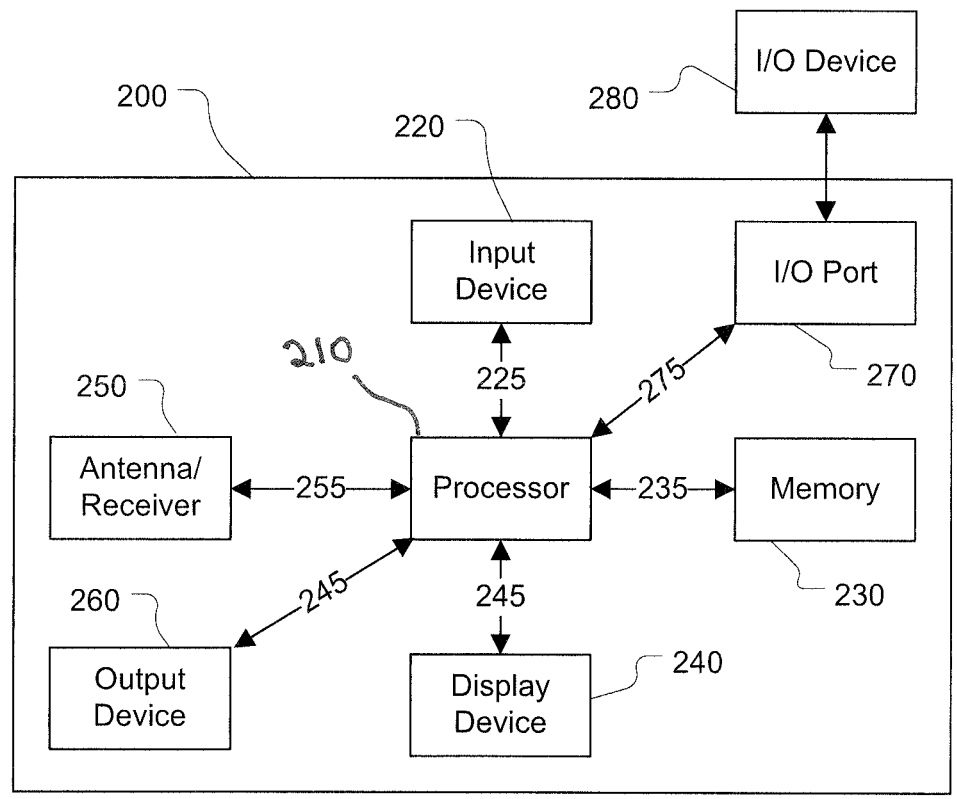
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 220 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
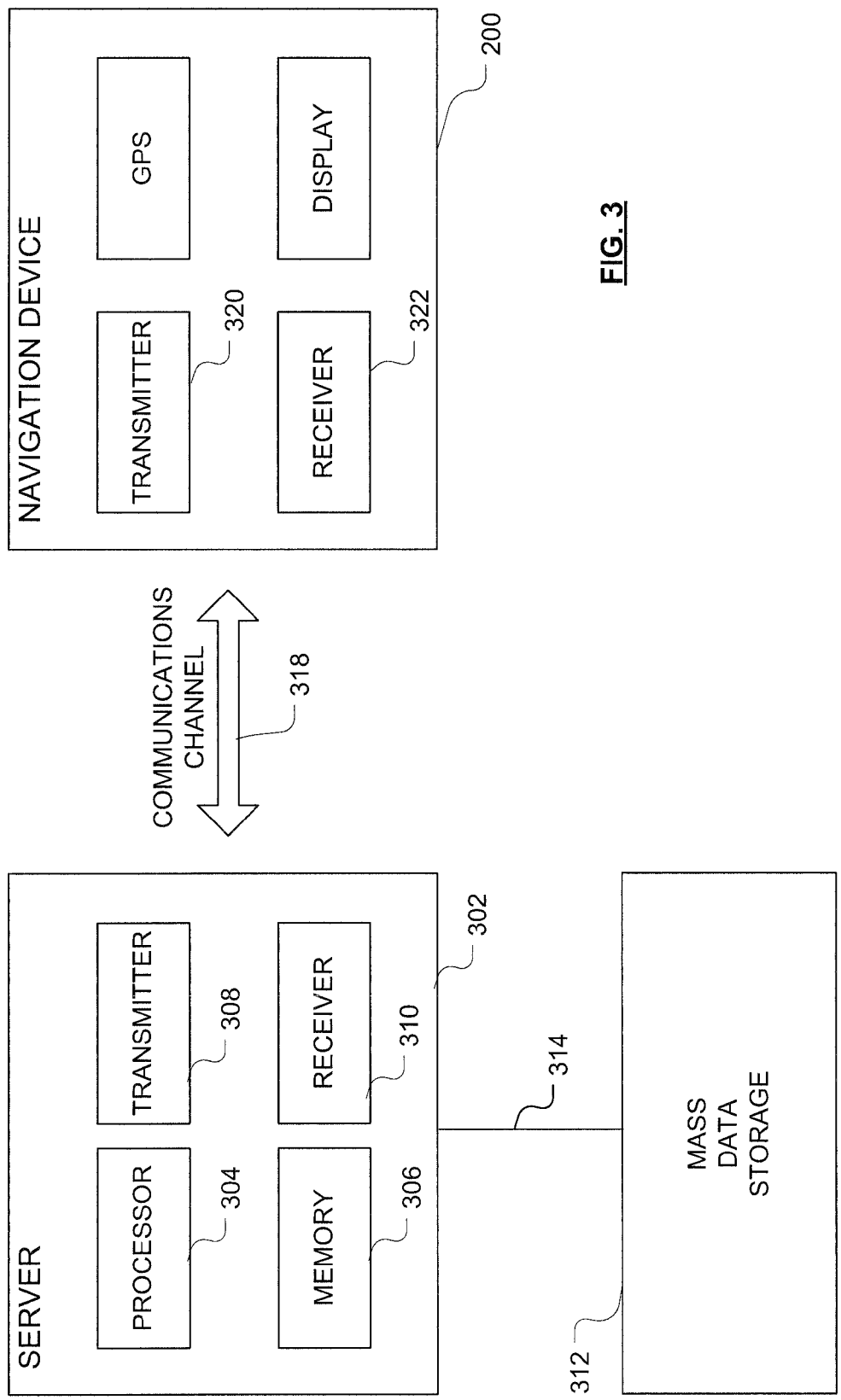
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as GPRS, the data protocol standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 260, such as audio input/output devices for example.

Figure 4A:
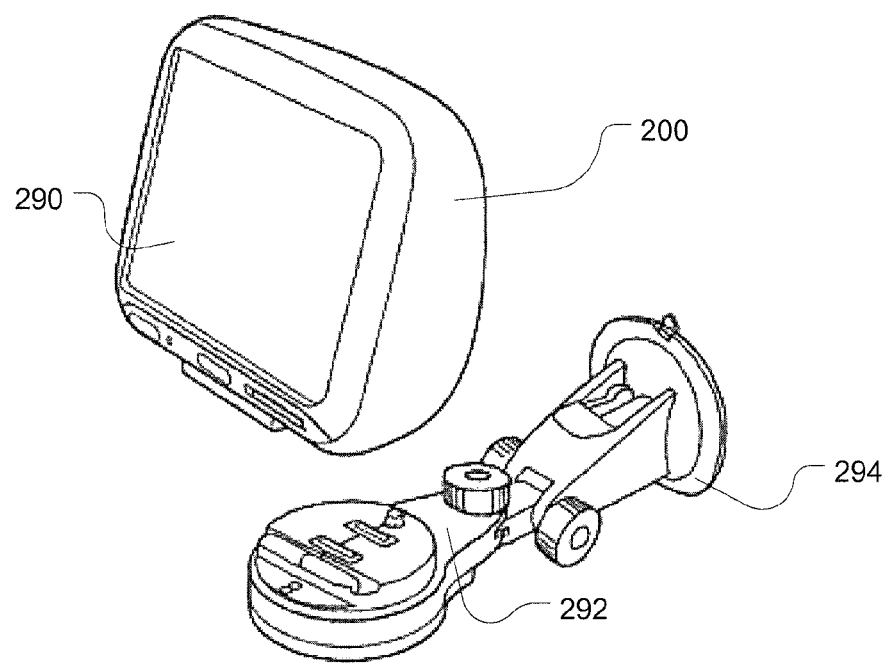
FIGS. 4A and 4B are illustrative perspective views of a navigation device.
Figure 4B:
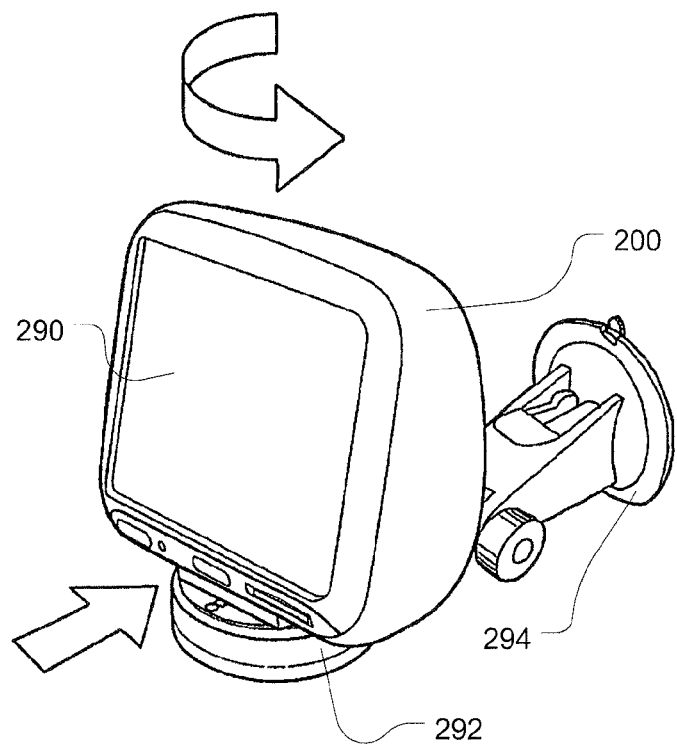

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 200 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

As discussed above, an important aspect of the operation of the navigation device 200 of the present embodiment is to display map information to a user on its display screen 240. The map information will be displayed, e.g., in response to a user's inputs, under the control of the processor 210. To facilitate this, the processor 210 includes a graphics processor that renders the desired images for display in response to appropriate graphics commands and data generated by the processor 210.

In common with many navigation devices, the navigation device 200 of the present embodiment uses tile-based road network rendering for displaying the map information to a user on the display screen 240. Thus, the graphics processor of the processor 210 renders the map information to be displayed by depicting the map information as tiles in 3D space, which tiles are then projected to 2D screen space when the image is actually displayed.

The present embodiment provides an improved method for such tile-based road network rendering which can, inter alia, provide improved display of features that are above and/or below a reference plane, such as water features.

Figure 5A:
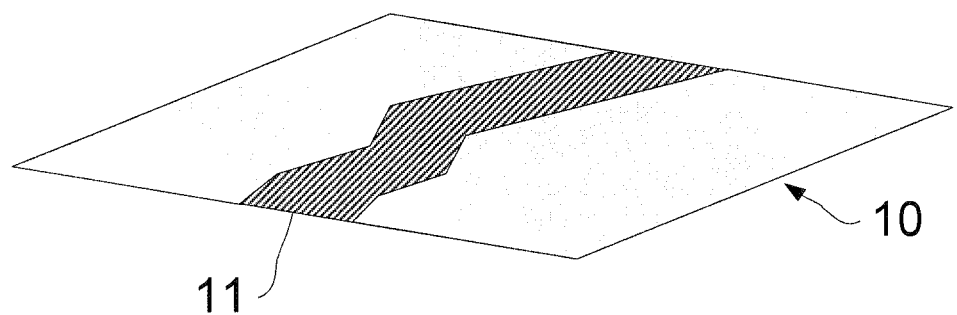
FIG. 5 shows schematically the rendering technique of the present invention.
Figure 5B:
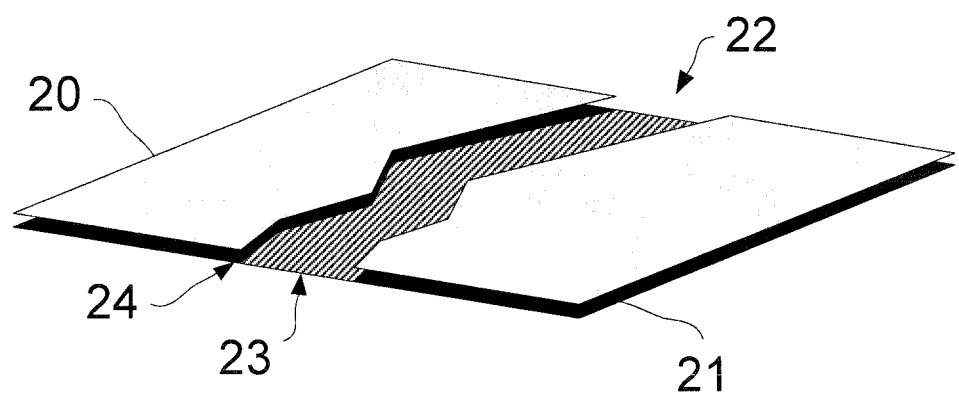

FIG. 5 illustrates the improved technique of the present embodiment. FIG. 5a shows a 3D world space tile 10 containing water feature 11 (in this example, a river) that has been rendered coplanar to the ground surface (to the plane of the tile 10). This can give a dull and unrealistic appearance. FIG. 5b shows the same image but rendered in accordance with the present invention. As can be seen, this provides an improved appearance for the tile in question.

As shown in FIG. 5b, to render the image, two overlapping (and substantially co-incident) tiles are in fact generated in the 3D ("world") space, a front tile 20, and a rear tile 21 that is behind (below) the front tile.

Moreover, a see-through shape 22 corresponding to the water feature 11 is provided in the front tile 20, so as to leave a gap in front tile 20 that the rear tile 21 can be seen through at the desired position of the water feature 11. The rear tile 21 is then rendered to include an image region 23 that represents the water feature 11 at a position such that it will be seen through the see-through shape (gap) 22 in the front tile 20. The image region 23 is bordered by a border colour or texture 24 that is also positioned so as to be visible through the gap 22 in the front tile.

The effect of this is that the water feature 23 and its border 24 on the rear tile 21 are seen through and below the gap 22 in the front tile 20 when the image is displayed, thereby providing, as shown in FIG. 5b, an enhanced appearance compared, e.g., to an arrangement as shown in FIG. 5a where the water feature 11 is rendered to be coplanar with the tile 10.

Figure 6:
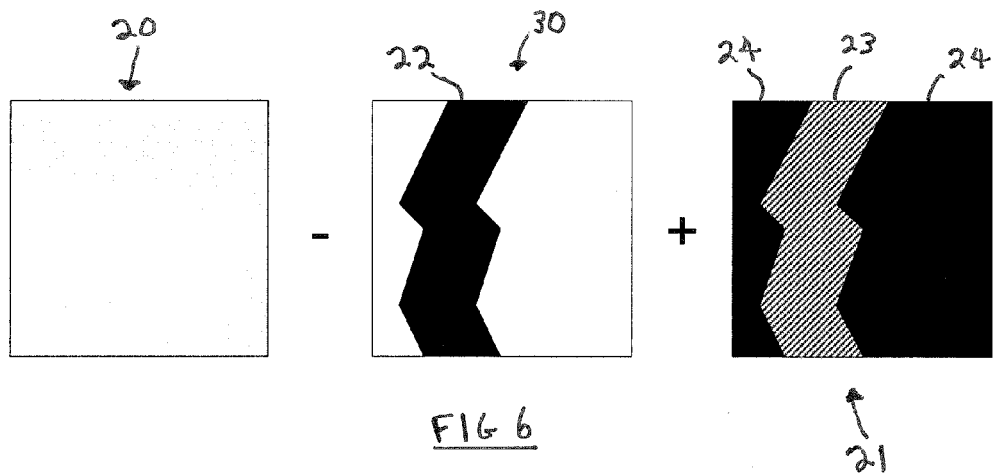
FIG. 6 shows schematically a preferred embodiment for implementing the rendering technique of the present invention.

FIG. 6 shows a suitable mechanism for rendering the image shown in FIG. 5b.

As shown in FIG. 6, the front tile 20 is rendered with an appropriate texture to, in this example, depict the "ground", and then a shape 22 representing the water feature 11 is cut out from that ground level tile 20 by the use of a stencil mask 30. (Other arrangements for providing the see-through shape 22 in the ground level tile 20 could be used if desired. For example, it would be possible to use alpha textures (transparency settings) to provide see-through shapes in the front tile to allow the viewer to see through to the tile below, or, indeed, to use more sophisticated methods, such as pixel shading techniques, for this purpose.)

The rear tile 21 is then rendered such that it has drawn on it an image region 23 representing the intended water feature 11, surrounded by a colour or texture 24 that represents a border for the water feature. This rear tile 21 is rendered, as shown in FIG. 5b, to appear behind and slightly offset relative to the front tile 20, such that the water feature and its corresponding border on the rear tile 21 can be seen through the see-through shape 22 in the front tile 20. In this way, a more visually appealing depiction of the water feature 11 can be achieved.

The front and rear tiles are rendered to be in front and behind each other by setting their positions in the 3D world space appropriately (i.e. such that one tile is behind (below) the other by an appropriate amount in the 3D world space depiction of the map).

Figure 7A:
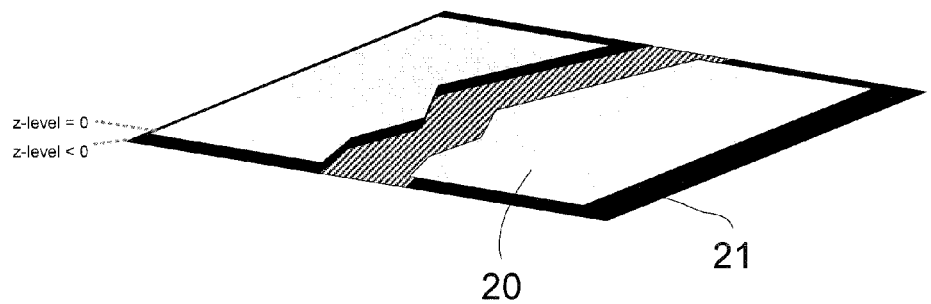
FIGS. 7 and 8 illustrate further preferred techniques for use in a preferred embodiment of the present invention.
Figure 7B:
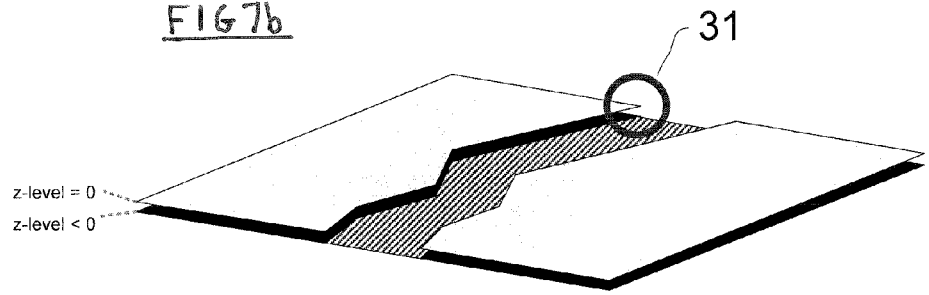

In the present embodiment, as shown in FIG. 7a, the rear tile 21 is enlarged relative to the front tile 20. This helps to compensate for visual artifacts 31 that may be created at the edges of the world (see FIG. 7b).

In the present embodiment, the spacing between the front and rear tiles can be decreased automatically as a function of the viewing distance. This helps to avoid the possibility of features of adjacent image regions 23 in a rear tile 21 being seen through a given see-through shape (gap) 22 in a front tile.

As the possibility of such erroneous display is more likely to occur when the viewing angle $\alpha$ is small (which occurs either when the map is tilted flat (as opposed to a straight top-down view) or with increasing the viewing distance), it can be countered by decreasing the distance d between the tiles to more acceptable values. Moreover, since viewing angles decrease as distance from the viewer increases, decreasing the spacing d between the tiles as a function of viewing distance is a relatively straightforward way to avoid this problem.

Figure 8:
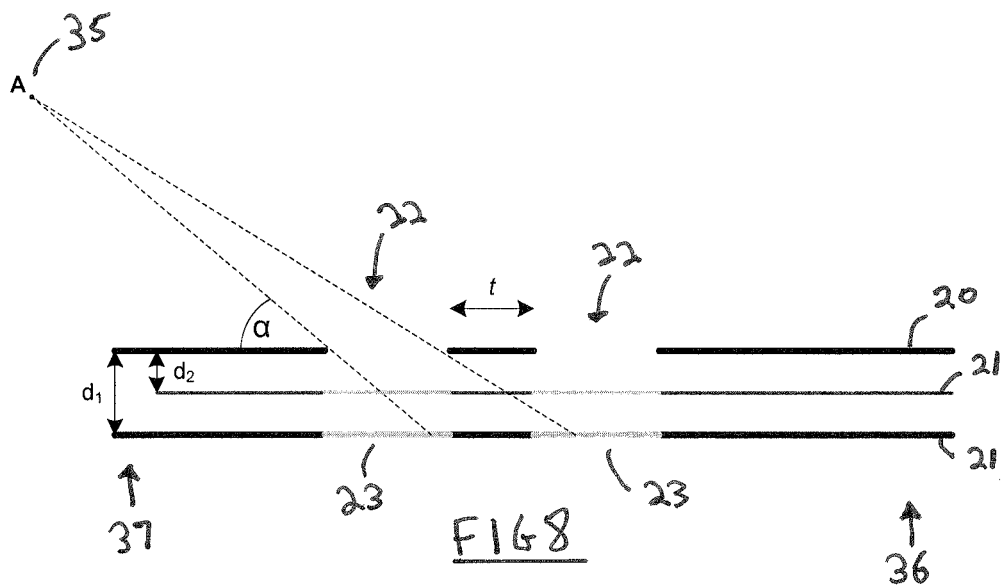

FIG. 8 illustrates this and shows decreasing of the distance between the two tiles 20, 21 from $d_1$ to $d_2$ to avoid the viewer 35 seeing adjacent image regions 23 in the rear tile 21. (When the spacing d between the tiles approaches zero, the lower tile 21 may be omitted (and if so the relevant rear tile(s) feature(s) should be shown on the "front" tile instead).)

Other arrangements to avoid erroneously displaying visible adjacent regions could also or instead be used if desired. For example, the rear tile could be tilted by moving the far side (seen from the viewer) up (i.e. by moving the right-hand side 36 of the rear tile 21 in FIG. 8 up relative to the left-hand side 37 of that tile).

Figure 9:
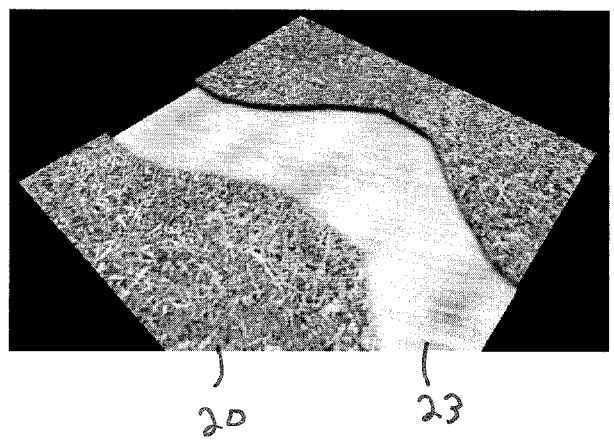
FIG. 9 shows exemplary images that have been rendered using the techniques of the present invention.
Figure 9:
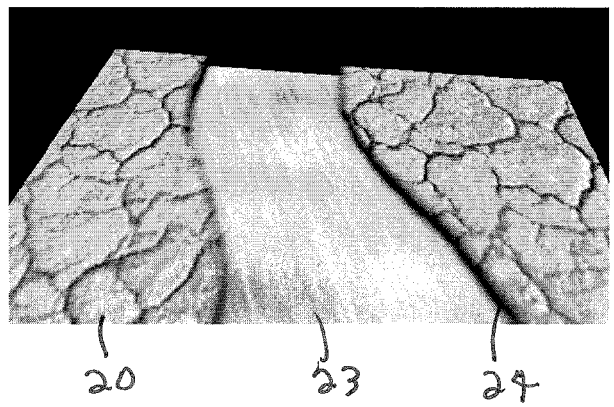
Figure 9:
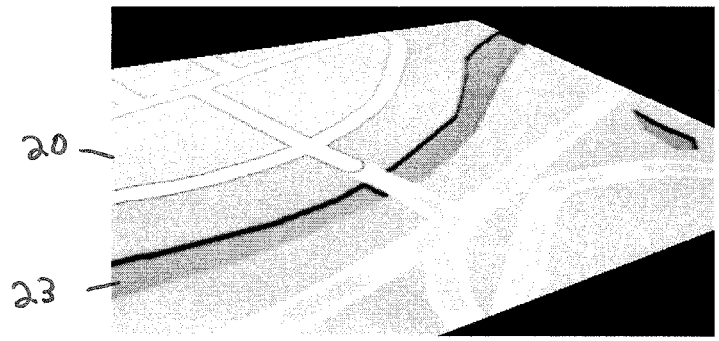

FIG. 9 shows further examples of the use of the present invention when rendering water features. In each of the images shown in FIG. 9, there is a water feature 23 surrounded by a border 24 shown on a rear tile, which is visible through a corresponding see-through shape 22 in a front tile 20 that depicts the ground level.

As well as being used to display water features, the present embodiment can be used advantageously to display other below ground level features, such as tunnels. In this case, by applying various textures or transparency levels to the see-through shapes in the front tile, an efficient way to render tunnels, for example, can be obtained.

Figure 10A:
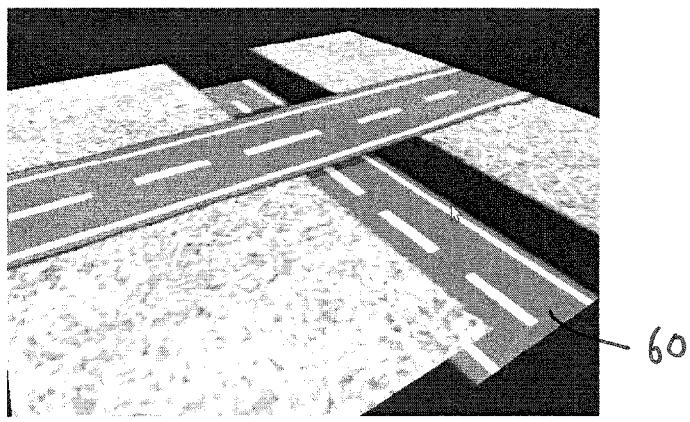

FIG. 10*a* shows a tunnel arrangement where a tunnel 60 is depicted by means of a fully transparent see-through shape in a front tile and by rendering appropriate tunnel, road surface and border images on a rear tile. (This arrangement can also be used to show lower-than-ground level roads but which are still in open air, for example.)

Figure 10B:
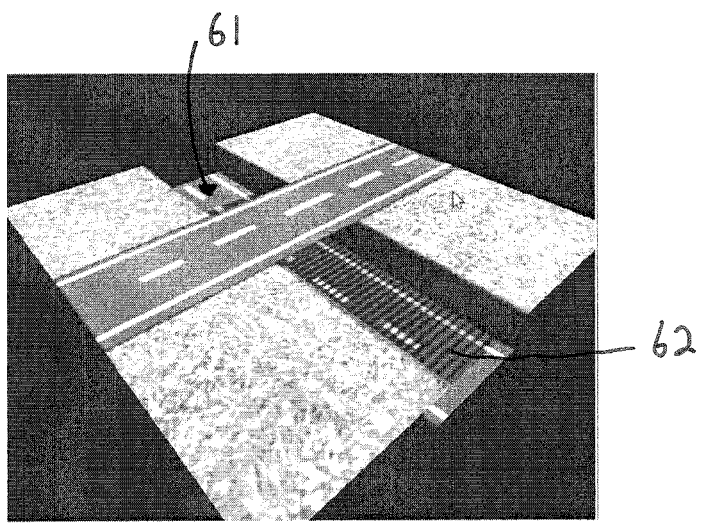

A preferred tunnel depiction can be achieved by rendering the see-through shape in the front tile to be fully transparent at the tunnel exit and entrance, but semi-transparent where the tunnel is actually underground. FIG. 10*b* shows this. In this case, the see-through shape in the front tile is, as shown, rendered to be fully transparent at the tunnel entrance 61 but to be semi-transparent 62 where the tunnel is actually underground.

Figure 11:
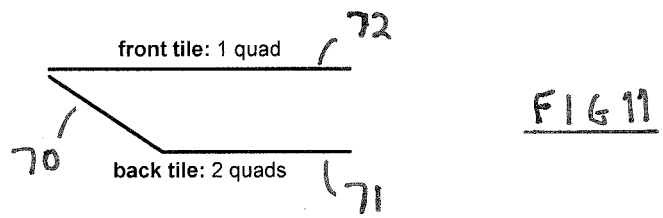
FIGS. 10, 11, 12 and 13 illustrate further preferred rendering techniques and images in accordance with the present invention.

A further improvement to the rendering of an entrance or exit of a tunnel can be achieved with only a minimal increase in geometry by splitting the rear tile and tilting one part up, for example to meet the front tile at the tunnel entrance (or exit). FIG. 11 illustrates this arrangement and shows two rear tiles 70, 71 arranged behind the corresponding front tile 72, with one of the rear tiles 70 tilted up to meet the front tile 72 (on which rear tile 70 the tunnel entrance (or exit) will be appropriately rendered). (It should be noted that in FIG. 4 a small gap is shown between the two tile layers for clarity, although in practice the rear tile 70 should preferably tilt up so as to touch the front tile 72 at its edge.)

Figure 12:
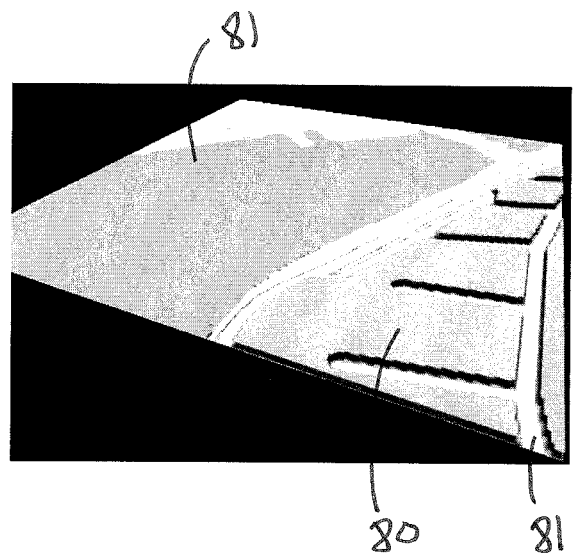

The technique of the present embodiment can equally be used to display above ground level features, such as the roofs of buildings. FIG. 12 illustrates this, and shows raised buildings 80 on a front tile, with the see-through regions 81 of the front tile then being arranged to show corresponding ground level features, such as water, roads, etc.

As well as being able to efficiently render features, such as indentations, in ground faces, the present embodiment can be used for other cases where other planar surfaces need to have an appearance of depth. One such typical navigation-related example is the rendering of buildings in city areas. In this case, the rendering technique of the present embodiment can be used, for example, when rendering windows in building faces, thereby giving a more realistic rendering effect.

Figure 13A:
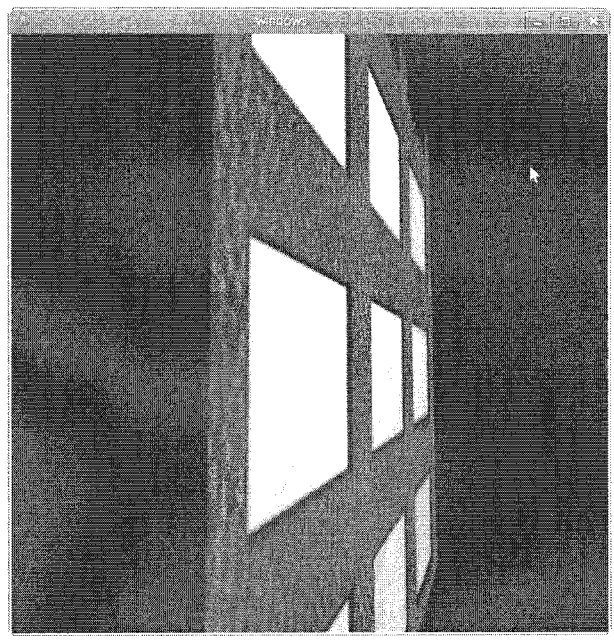
Figure 13B:
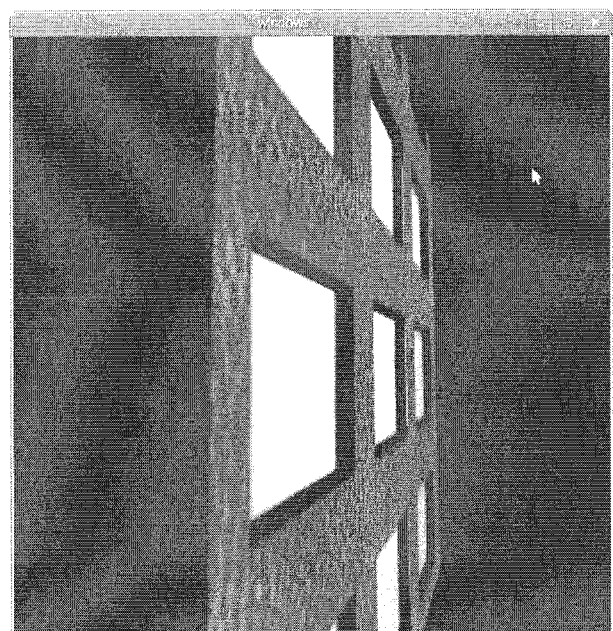

FIG. 13 illustrates this. FIG. 13*a* shows a building rendered without the use of the techniques of the present invention, by applying a single texture to the face of the building. FIG. 13*b* shows the corresponding image rendered using the technique of the present invention, i.e. with a front tile showing the front building face with see-through shapes for the positions of the windows, and a rear tile having appropriate image regions depicting the windows surrounded by borders rendered thereon.

In this embodiment, where building faces use a repetitive texture, then the building may be rendered by creating a front tile texture and a back tile texture for a single window and repeating those tile arrangements over the whole face of the building.

Although the present embodiment has been illustrated above using two levels of tiles, it would be possible to stack plural layers or levels of tiles. This can be used to give borders of different types and/or at different relative depths.

Figure 14:
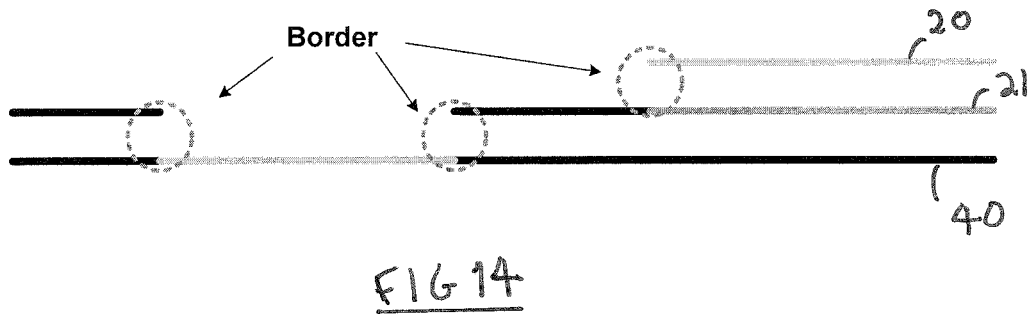
FIGS. 14 and 15 illustrate a further preferred embodiment of the present invention.

FIG. 14 illustrates this, and shows the use of three layers of tiles 20, 21 and 40. This could be used to display, for example, both water features and the roofs of buildings.

Figure 15:
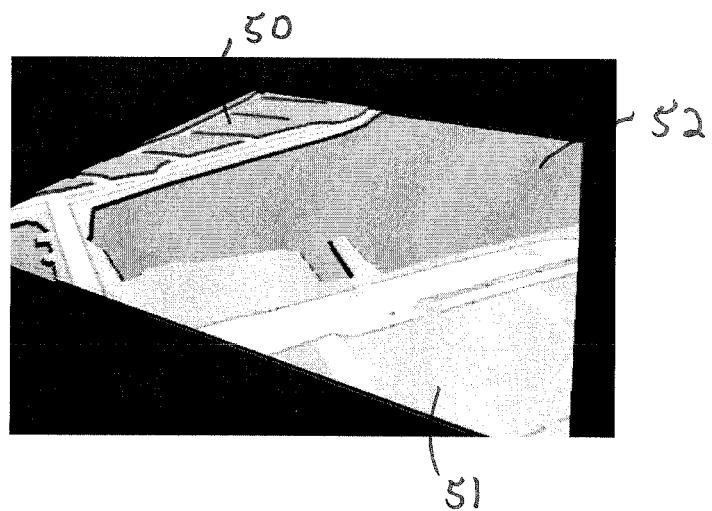

FIG. 15 shows an image of the waterfront near Amsterdam station which has been rendered using three layers of tiles, a front tile layer 50 to show the raised buildings, an intermediate rear tile layer 51 showing ground level features, and then a back rear tile layer 52 showing the lowered water surface. In this case, the intermediate rear tile 51 (the middle layer tile) has both image regions that are intended to be seen through the see-through shapes in the front tile, and its own see-through shapes to allow the water features in the back rear tile 52 to be seen when the image is rendered.

Various modifications and other arrangements can be used in the present embodiment and the present invention if desired.

For example, if the graphics hardware of the navigation device 200 supports pixel shading operations, those operations can be used to further increase the overall visual quality of the tiles. For example, pixel shading operations can be used to simulate the effect of reflected sunlight or waves to create a realistic water effect. It would also be possible, for example, when rendering water, to vary the offset of the rear tile containing the water feature relative to the front tile to create, for example, the effect of tide or waves.

It would also be possible to render the edges of the see-through shapes in the tiles to be semi-transparent. By applying semi-transparency to the edges of the see-through shapes in the tiles, hard lines in the rendered image can be avoided.

Figure 16:
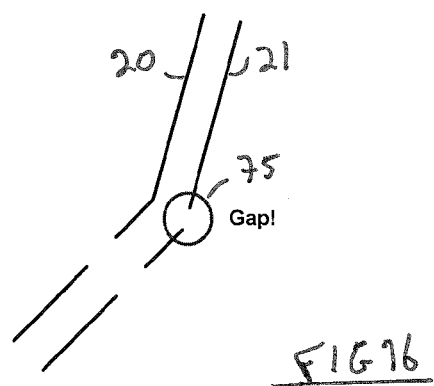
FIG. 16 shows a further feature of a preferred embodiment of the present invention.

The Applicants have further recognised that if the present invention were naively applied to elevation or terrain models, there could be the possibility of "gaps" forming between adjacent rear tiles. FIG. 16 illustrates this. The size of the gap 75 will be dependent on both the angle between the tiles 20, 21 and the distance between the front and rear tile planes. Furthermore, if the spacing between front and rear tiles is not the same for adjacent tiles, a gap may also occur. The effect of such gaps can be counteracted by scaling the rear tiles and/or by rendering them using different geometry and/or textures, so that they touch, and/or by decreasing the rear tile to front tile distance.

As will be appreciated by those skilled in the art, although the above example has been described primarily with reference to the rendering of a single tile position in the 3D world space, the present invention may be used for as many tile positions as are desired in the image being displayed. Indeed, it may typically be used for a series of contiguous tiles through which, e.g., a given water feature, such as a river, passes. The remaining tiles making up the image may be rendered in the normal manner.

Although the present invention has been described above with particular reference to its use in portable navigation devices (and, as will be appreciated by those skilled in the art, the present invention has particular application and advantage in systems with limited graphical capabilities such as mobile or embedded systems), the present invention can be used advantageously in high-end systems as well. For example, a 3D view of a city may contain hundreds of buildings and while a high performance graphics accelerator may be able to render those buildings in detail using high vertex models, the techniques of the present invention may be more efficient for the large numbers of geometry further away from the viewer where detail is typically less important than for the portions of the image that are nearer to the viewer. For those nearer portions, full 3D, high detail, high vertex models can still be used, thereby balancing performance and quality.

The technique can also be used, for example, to get a distinctive "signature" look for a displayed image, and/or to provide a better user experience because details may be left out, thereby creating a picture that may be "easier on the eye" overall.

As will be appreciated from the above, the present invention provides a relatively fast and efficient way to improve the visual quality of e.g., tile-based map display, which is, inter alia, particularly suited to embedded graphics hardware, since it can create suitable effects with only a limited increase in geometry or no increase in geometry. The invention may also be used with more powerful graphics accelerators, as it can be used to decrease the amount geometry needed to be stored and rendered.

It may be used, for example, for rendering water features, building roofs, tunnels, etc., or any other features which stand above or below a particular reference plane.

This is achieved in the preferred embodiments of the present invention at least, by rendering a front tile with one or more see-through shapes to provide regions through which features may be seen, and then rendering one or more rear tiles which appear behind the front tiles and that have image regions denoting the necessary features that are to be seen through the see-through regions (shapes) in the front tiles. In a preferred embodiment the image regions of the rear tiles are surrounded by appropriate border features, such that both the desired image region, such as the water feature, and an appropriate border will be seen through the front tile when the image is rendered.

Thus, in a preferred embodiment, see-through shapes are provided in a front tile that is being rendered and a border effect is then created by rendering a tile or set of tiles behind the front tile with a slight offset and filling those tiles with the intended water, window or other texture and a colour or texture that represents the border, such that they will be seen through the shapes in the front tile.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment may implement certain functionality by means of software, that functionality could equally be implemented solely in hardware (for example by means of one or more ASICs (application specific integrated circuit)) or indeed by a mix of hardware and software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A computer implemented method of generating an image representative of map information for display on a display screen, comprising:
   accessing digital map data to obtain map information representative of a geographic area, said map information including one or more first features in a plane, and one or more second features below the plane;
   rendering said obtained map information to generate an image representative of said map information, said rendering comprising:
      generating, in a three dimensional space, a front tile and a rear tile, said rear tile being behind the front tile relative to a viewing position for the image, and said rear tile being spaced from the front tile by a predetermined distance, wherein a first portion of the front tile is coloured and/or textured to represent the one or more first features and a second portion of the front tile includes one or more see-through shapes in the plane of the tile, and wherein a first portion of the rear tile is coloured and/or textured to represent the one or more second features and a second portion of the rear tile that is coloured and/or textured to contrast with the first portion of the front tile, and wherein the first portion of the rear tile overlaps with the second portion of the front tile; and
      projecting the generated front and rear tiles to a two dimensional space from the viewing position to generate the image, wherein the relative position and predetermined distance between the front and rear tiles cause at least part of the second portion of the rear tile to appear in the generated image surrounding the one or more first features of the first portion of the front tile so as to create a border effect; and
      providing said generated image for display on a display screen.

2. The method of claim 1, comprising rendering three or more layers of tiles in the image to be displayed.

3. The method of claim 1, comprising rendering a see-through shape in a tile using two or more different transparency levels.

4. The method of claim 1, comprising rendering the edges of a see-through shape in a tile with a different transparency level to the body of the see-through shape.

5. The method of claim 1, comprising varying the position of the rear tile relative to the front tile while the image is being displayed.

6. The method of claim 1, comprising varying the distance between the front and rear tiles while the image is being displayed as a function of a changing viewing position for the image.

7. The method of claim 1, wherein the first features correspond to ground level features and the second features correspond to below ground level features.

8. A navigation or mapping apparatus for generating an image representative of map information for display on a display screen, said apparatus comprising a display and at least one processor configured to:

access digital map data to obtain map information representative of a geographic area, said map information including one or more first features in a plane, and one or more second features below the plane;

render said obtained map information to generate an image representative of said map information by:

generating, in a three dimensional space, a front tile and a rear tile, said rear tile being behind the front tile relative to a viewing position for the image, and said rear tile being spaced from the front tile by a predetermined distance, wherein a first portion of the front tile is coloured and/or textured to represent the one or more first features and a second portion of the front tile includes one or more see-through shapes in the plane of the tile, and wherein a first portion of the rear tile is coloured and/or textured to represent the one or more second features and a second portion of the rear tile that is coloured and/or textured to contrast with the first portion of the front tile, and wherein the first portion of the rear tile overlaps with the second portion of the front tile; and projecting the generated front and rear tiles to a two dimensional space from the viewing position to generate the image, wherein the relative position and predetermined distance between the front and rear tiles cause at least part of the second portion of the rear tile to appear surrounding the one or more first features of the first portion of the front tile so as to create a border effect; and provide said generated image for display on a display screen of the display.

9. The apparatus of claim 8, wherein the at least one processor is further configured to render three or more layers of tiles in the image to be displayed.

10. The apparatus of claim 8, wherein the at least one processor is further configured to render a see-through shape in a tile using two or more different transparency levels.

11. The apparatus of claim 8, wherein the at least one processor is further configured to render the edges of a see-through shape in a tile with a different transparency level to the body of the see-through shape.

12. The apparatus of claim 8, wherein the at least one processor is further configured to vary the position of the rear tile relative to the front tile while the image is being displayed.

13. The apparatus of claim 8, wherein the first features correspond to ground level features and the second features correspond to below ground level features.

14. The apparatus of claim 8, wherein the at least one processor is further configured to vary the distance between the front and rear tiles while the image is being displayed as a function of a changing viewing position for the image.

15. A portable navigation device (PND) or an integrated navigation system comprising the apparatus of claim 8.

16. A non-transitory computer readable medium having computer software stored thereon comprising one or more software modules operable, when executed in an execution environment, to cause a processor to perform a method of generating an image representative of map information for display on a display screen, comprising:

accessing digital map data to obtain map information representative of a geographic area, said map information including one or more first features in a plane, and one or more second features below the plane;

rendering said obtained map information to generate an image representative of said map information by:

generating, in a three dimensional space, a front tile and a rear tile, said rear tile being behind the front tile relative to a viewing position for the image, and said rear tile being spaced from the front tile by a predetermined distance, wherein a first portion of the front tile is coloured and/or textured to represent the one or more first features and a second portion of the front tile includes one or more see-through shapes in the plane of the tile, and wherein a first portion of the rear tile is coloured and/or textured to represent the one or more second features and a second portion of the rear tile that is coloured and/or textured to contrast with the first portion of the front tile, and wherein the first portion of the rear tile overlaps with the second portion of the front tile; and projecting the generated front and rear tiles to a two dimensional space from the viewing position to generate the image, wherein the relative position and predetermined distance between the front and rear tiles cause at least part of the second portion of the rear tile to appear surrounding the one or more first features of the first portion of the front tile so as to create a border effect; and providing said generated image for display on a display screen of the display.

* * * * *